No. 779,931.

PATENTED JAN. 10, 1905.

W. HARKER & A. T. ALLCOCK.
BORING MACHINE.
APPLICATION FILED MAY 25, 1903.

7 SHEETS—SHEET 1.

FIG: 3.

No. 779,931. PATENTED JAN. 10, 1905.
W. HARKER & A. T. ALLCOCK.
BORING MACHINE.
APPLICATION FILED MAY 25, 1903.

7 SHEETS—SHEET 4.

Witnesses:

Inventors
William Harker
Arthur T. Allcock
By James L. Norris.
Atty.

FIG: 6.

No. 779,931. PATENTED JAN. 10, 1905.
W. HARKER & A. T. ALLCOCK.
BORING MACHINE.
APPLICATION FILED MAY 25, 1903.

7 SHEETS—SHEET 6.

Witnesses:
Inventors
William Harker
Arthur T. Allcock

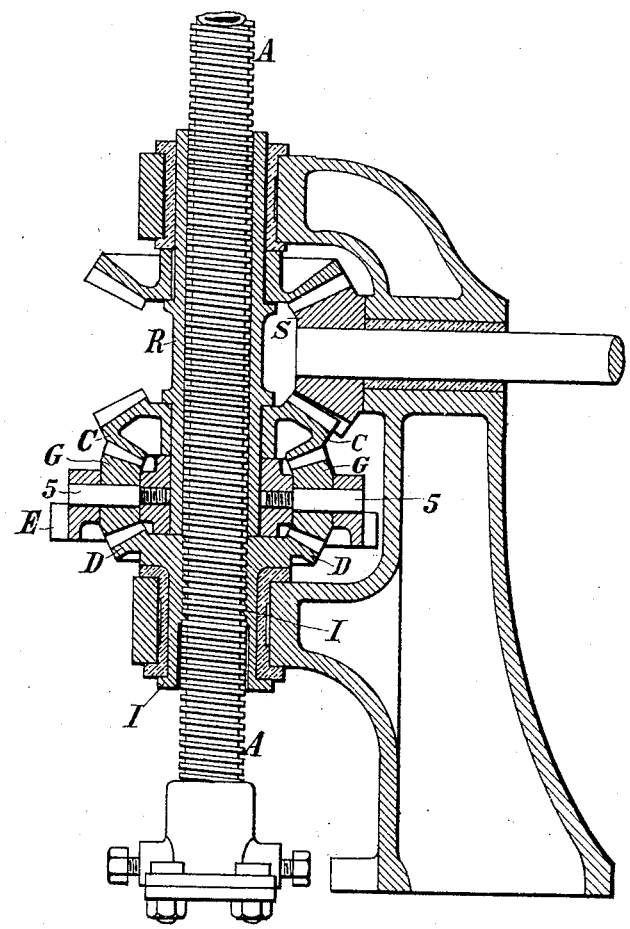
FIG: 8.

No. 779,931.

Patented January 10, 1905.

UNITED STATES PATENT OFFICE.

WILLIAM HARKER, OF LONDON, AND ARTHUR THOMAS ALLCOCK, OF NEWARK-ON-TRENT, ENGLAND.

BORING-MACHINE.

SPECIFICATION forming part of Letters Patent No. 779,931, dated January 10, 1905.

Application filed May 25, 1903. Serial No. 158,742.

*To all whom it may concern:*

Be it known that we, WILLIAM HARKER, residing at Cannon Street House, London, and ARTHUR THOMAS ALLCOCK, residing at Spring Gardens, Newark-on-Trent, in the county of Nottingham, England, subjects of the King of Great Britain, have invented certain new and useful Improvements in Boring-Machines, of which the following is a specification.

Our invention relates to that class of boring-machines in which the feed motion to the boring-bar is derived from a screw (which forms a portion of or is a continuation of the boring-bar) and a nut encircling the screw and capable of being revolved in a fixed bearing, the amount of feed and its direction depending upon the difference in the velocity of the screw and its nut. As hitherto constructed the varying velocity between the screw and its nut has been obtained by means of a counter-shaft driven by the screw with a pair of toothed wheels and giving motion to the nut by means of a second pair of toothed wheels having a different number of teeth to the drivers, so requiring change-wheels for each different velocity that may be required.

The object of our invention is to provide a feed mechanism which will obviate the necessity of change-wheels and enable the velocity of the nut, and consequently the amount of the feed, to be varied and more precisely regulated, as required.

Figure 1:
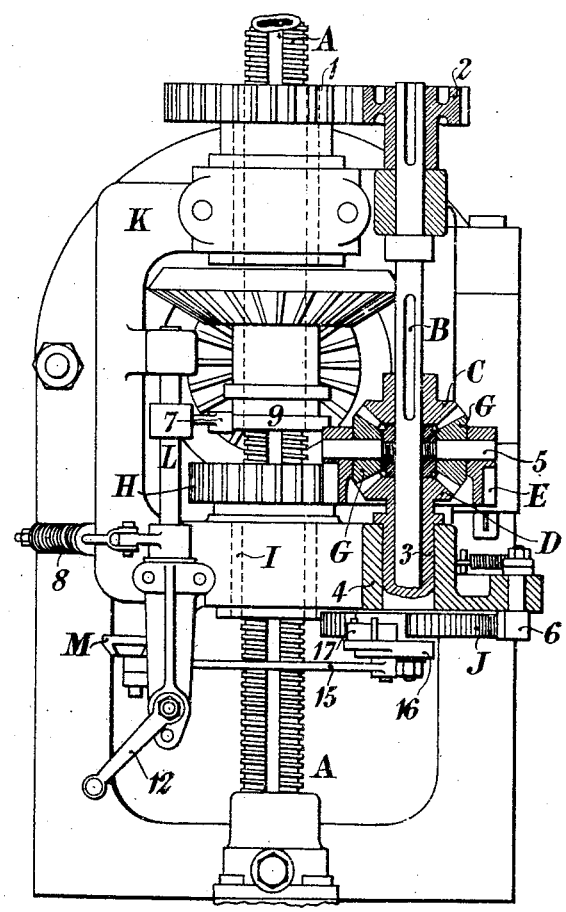
Figure 2:
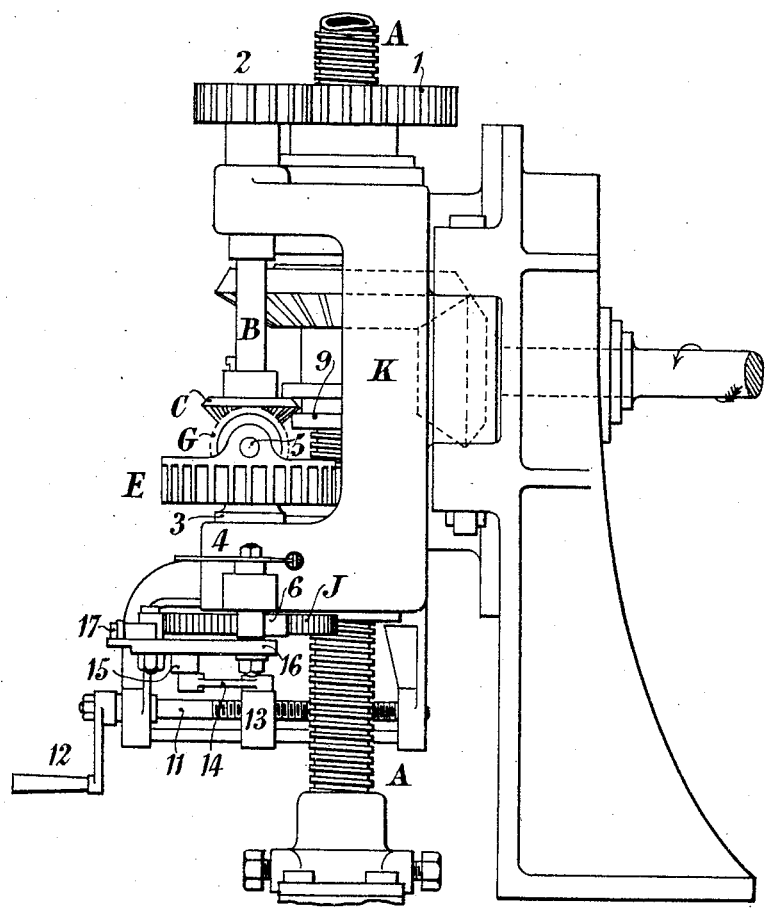
Figure 3:
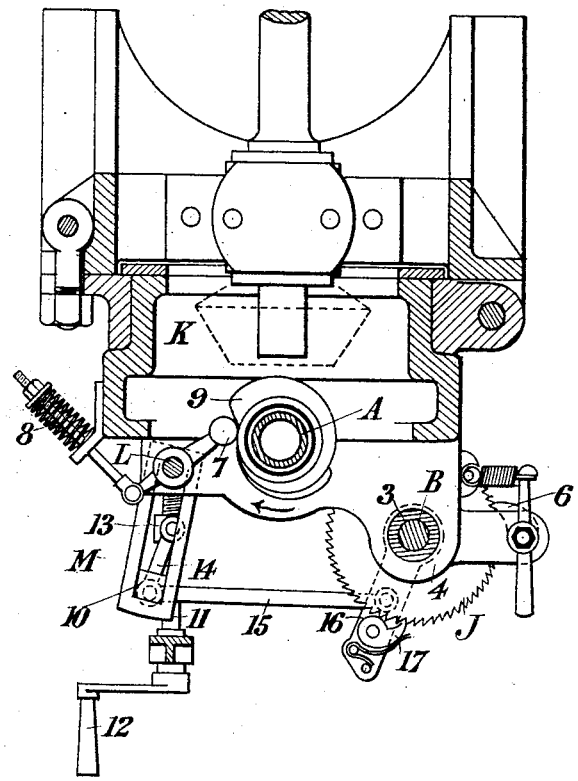
Figure 4:
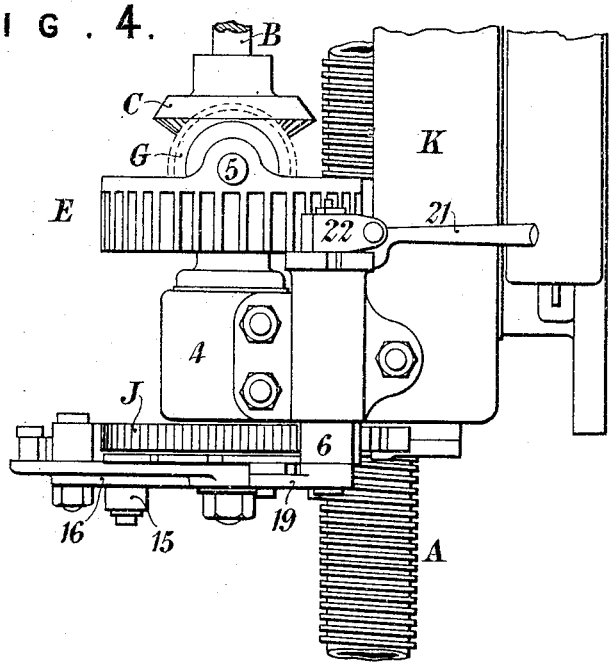
Figure 5:
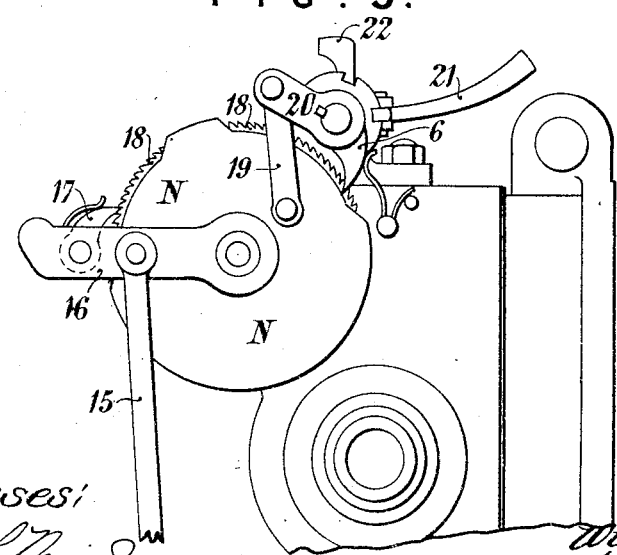
Figure 6:
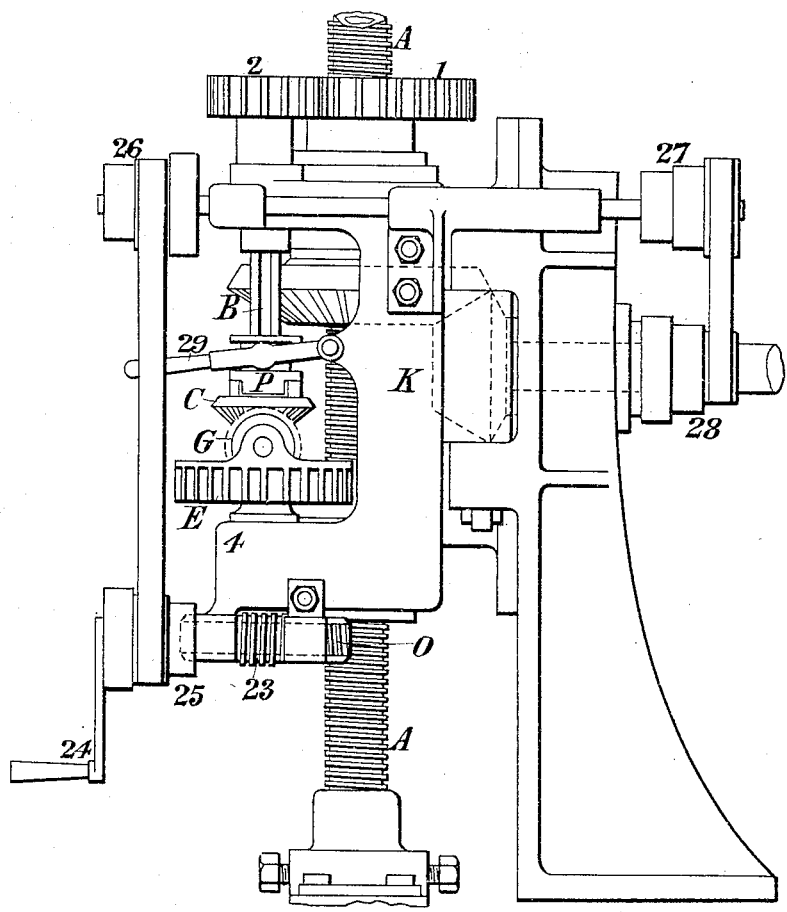
Figure 7:
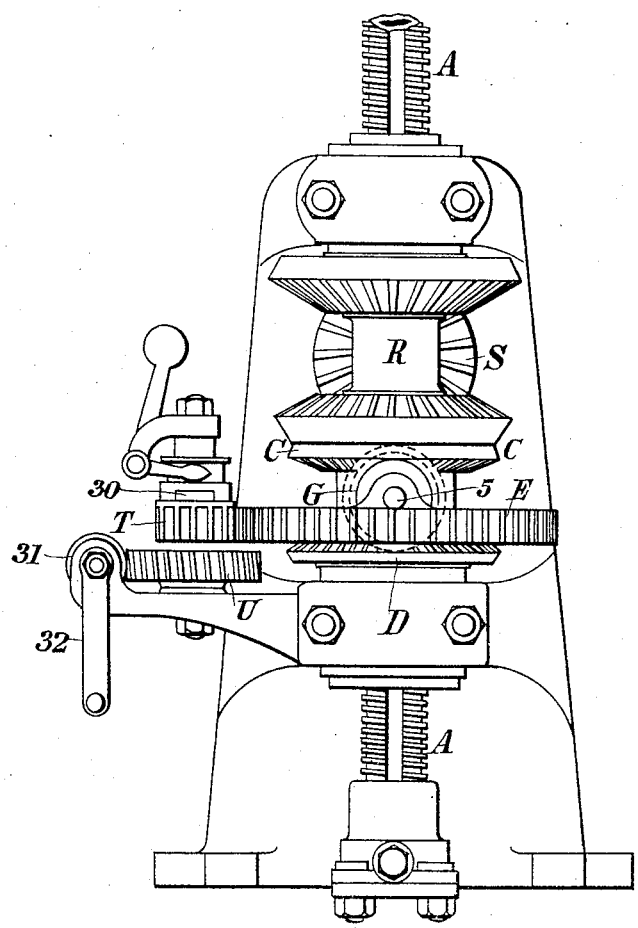

In the accompanying drawings, Figures 1, 2, and 3 are respectively front elevation, side elevation, and sectional plan of an improved boring-machine. Figs. 4 and 5 are respectively side elevation and under side plan of mechanism for reversing the feed of the main screw. Fig. 6 is a side elevation of a modification, and Figs. 7 and 8 are respectively front elevation and vertical section of another modification.

In our invention, as shown in Figs. 1, 2, and 3, the screw A drives the counter-shaft B at twice its own velocity by means of the toothed wheels 1 and 2. Upon the counter-shaft B we fix a bevel-wheel C, and below this is a similar bevel-wheel D, but loose upon the counter-shaft and having its boss 3 supported by and capable of rotation in a fixed bearing 4. Between these two bevel-wheels is a spur-wheel E, running loose upon the counter-shaft B and provided with two or more bevel-wheels G, revolving upon axles 5, attached to the spur-wheel E. These bevel-wheels are in gear with both the fast and loose bevel-wheels C and D upon the counter-shaft and form a "balance-gear." The spur-wheel E of the balance-gear engages with a similar wheel H, attached to the feed-nut I of the screw A. The ratio of the gear H to the gears C E G is the same as the ratio of the gear 2 to the gear 1. The result of this combination is that when the lower bevel-wheel D, which is loose upon the counter-shaft B, is held stationary the feed-nut I and its spur-wheel H will be driven by the balance-gear at the same velocity and in the same direction as the screw A, and no feed or longitudinal motion will ensue. When the lower bevel-wheel D is left free to revolve, no motion will be transmitted by the balance-gear to the nut I and its spur-wheel H, and the screw will move up or down in the nut according to the direction of its revolutions. When the lower bevel-wheel D is rotated, the motion given to it will be communicated by the balance-gear to the nut I and its spur-wheel H in proportion to the speed and direction of such rotation, so that a positive or a negative feed will be given to the screw A.

In diamond-boring and other like machines where the frame K, carrying the boring-bar screw, is so constructed, as shown in Figs. 1, 2, and 3, that it may be set to bore at varying angles and also where the boring-rod screw is carried in a swinging frame, so that it may be swung clear of the bore-holes, it is necessary that the whole of the feed mechanism should be fixed to the frame K, so as to be capable of moving with the actuating or boring rod screw A and its frame K when set at an angle or swung open. For this purpose we construct the feed-gear as above described, and on the boss of the lower (loose) bevel-wheel D we attach a ratchet-wheel J, furnished with a pawl 6, pivoted to the frame K, so that when the pawl 6 is in position the ratchet-wheel J and its bevel-wheel D are held stationary and prevented from revolving in one direction with the rest of the balance-gear. In that position the feed-nut I will rotate at the same speed and in the same direction as the screw, and no longitudinal motion or feed will be given it. On releasing the pawl 6 the ratchet-wheel J and its bevel-wheel D will be free to revolve with the balance-gear and transmit no motion to the nut I. The revolving screw will then work in the stationary nut and be withdrawn from the borehole. To give a variable automatic feed, we fix in bearings on the frame K a second small counter-shaft L. This shaft carries an arm 7, Fig. 3, bearing, with a pressure obtained from a spring 8, upon a cam or cams 9, attached to or formed upon a sleeve rotating with the boring-bar screw A. This gives an oscillating motion to the shaft L, the oscillations varying according to the number and depth of the lobes upon the cam with which its arm is in contact. Upon the lower end of the shaft L we fix a second arm M, upon which is mounted a sliding block 10, which can be moved to and from the center of oscillation by means of a screw 11, furnished with a handle or hand-wheel 12, and a sliding nut 13, connected to the slider 10 by a link 14. A connecting-rod 15 couples the slider 10 with a radius-bar 16, working loose on the axis of the ratchet-wheel J. A pawl 17 on the radius-bar 16 engages with the ratchet-wheel J, and so communicates the motion of the slider 10 to it in one direction, the amount of such motion and the feed being regulated by the handle 12 and its screw 11.

In the arrangement shown on Figs. 1, 2, and 3 there are two methods of stopping the feed—viz., one by screwing in the slider 10 until it coincides with the center of oscillation of the arm M and another by throwing the pawl 17 out of gear with the ratchet-wheel J. When the feed is to be reversed and feed-screw A withdrawn, both pawls 6 and 17 have to be disengaged from the ratchet-wheel J. A method of doing this instantaneously and by one operation is shown on Figs. 4 and 5. For this purpose we pivot a circular plate N on the axis of the ratchet-wheel J. This plate is made of larger diameter than the ratchet-wheel J, covering its teeth and preventing the pawls 6 and 17 from falling into gear when the plate is in one position. Spaces or gaps 18 are cut in the plate N to allow the pawls to work when in another position, which is the normal one. When the feed is on, as shown in Figs. 4 and 5, a link 19 and arm 20 connect the plate to the hand-lever 21, so that it can be turned on its axis and both pawls thrown out of gear by a partial revolution of the hand-lever 21 round its axis. The hand-lever 21 has a projection adapted to engage notches to hold same in position when adjusted and may also be provided with a pawl or brake 22, so that should the friction of the screw carry the nut round with it when the pawls 6 and 17 are released by the hand-lever 21 a further motion of the hand-lever will bring the pawl or brake 22 in contact with the loose wheel E of the balance-gear and arrest its motion.

Fig. 6 shows a modification of the feed arrangement as above described. Instead of the ratchet-wheel J we fix in or on the boss 3 of the lower bevel-wheel D a worm-wheel O, driven by a worm 23, actuated by a handle 24, so that the lower bevel-wheel D of the balance-gear may be rotated by hand in either direction and a positive or negative feed given to the boring-bar screw A. A belt speed-cone 25 may be mounted on the driving-shaft of the worm 23 and driven by the speed-cone 26, fixed on a shaft carried in bearings on the frame of the machine and driven by other speed-cones 27 and 28 from the main driving-shaft of the machine. By changing the belts on the steps of the cones various speeds may be given to the worm-wheel O and the rate of feed altered. When a worm-wheel O is used in the place of the ratchet-wheel J, it cannot be readily disengaged from its worm 23 to allow the feed-nut to remain stationary and the screw A to ascend. We therefore provide the upper bevel-wheel C with a clutch P, by means of which it may be disconnected by the lever 29 from its driving-shaft B, so that no motion will be given by it to the balance-gear and nut.

Figs. 7 and 8 show an arrangement by which the balance-gear instead of being carried on a shaft parallel to the boring-bar screw is coaxial with it and supported on a sleeve R, surrounding the screw A. The sleeve R revolves with the screw A, but is longitudinally immovable, as will be understood. The upper bevel-wheel C of the balance-gear is loose upon the sleeve R and is driven in a reverse direction to the screw A by the main driving-pinion S, being furnished with an upper set of teeth for that purpose. The spur-wheel E, also loose upon the sleeve R, carries the intermediate bevel-wheels G, revolving upon the axles 5, attached to the spur-wheel E. The bevel-wheels G gear with the lower bevel-wheel D, which is made in one piece with or attached to the feed-nut I, and the wheels G also gear with the upper bevel-wheel C and form a balance-gear similar in its action to that described above. The result of this combination is that when the spur-wheel E is held stationary the upper bevel-wheel C, acting through the bevel-wheels G, drives the lower bevel-wheel D and the nut I in the same direction and at the same velocity as the feed-screw A, and no longitudinal motion ensues. If the spur-wheel E is allowed to revolve, no motion will be transmitted to the lower bevel-wheel D and nut I, and the screw A will consequently ascend through the stationary nut I. When the spur-wheel E is revolved in the same direction as the screw, its motion will be communicated through the bevel-wheels G to the lower bevel-wheel D and the nut I and its motion accelerated, causing the screw A to feed downward in proportion to the difference of the speeds between the nut and the screw. Various methods may be employed to actuate the spur-wheel E, one of which is shown in Figs. 7 and 8. Gearing with the spur-wheel E is a pinion T, which can be connected to or disconnected from the worm-wheel U by the clutch 30. The worm 31 actuates the worm-wheel and may be driven by the handle 32 or by speed-cones in a similar manner to that shown in Fig. 6. The clutch 30 allows the pinion T to be disconnected from the worm-wheel U and revolve with its wheel E when the feed-screw A is to be raised or withdrawn. The spur-wheel E may also be formed as a ratchet-wheel and receive its motion and be released in a similar manner to that described in Figs. 1, 2, 3, 4, and 5.

We claim—

1. In a boring-machine, the combination with a screw-shaft boring-bar and a counter-shaft geared therewith, of an upper bevel-wheel fixed to said counter-shaft, a lower bevel-wheel loose upon said counter-shaft, a spur-wheel loose upon said counter-shaft, a plurality of bevel-pinions carried by said spur-wheel and mounted between said bevel-wheels, a nut mounted upon said bar, a spur-wheel carried by said nut and engaging with the spur-wheel upon the counter-shaft, and means adapted to control the rotary motion of said lower bevel-wheel, thereby controlling the operation of the spur-wheel carried by the nut and varying the feed and effecting a rapid reversal of said boring-bar.

2. In a boring-machine, the combination with a screw-shaft boring-bar, a nut mounted thereon, a balance-gear engaging with the nut for operating it, and means for controlling the operation of the gear for imparting a variable automatic feed of said bar, said means consisting of a vertically-disposed rock-shaft, an arm clenched to said rock-shaft, a slider adapted to be adjusted in guides on said arm, a screw-threaded shaft, a nut upon said screw-threaded shaft, a link connecting the slider with said nut, a connecting-rod pivoted to said slider and to said controlling means for the balance-gear, means for rotating said screw-threaded shaft, and means for reciprocating said rock-shaft.

3. In a boring-machine, the combination of a rotatable screw-shaft boring-bar, a counter-shaft, an operative connection between said rotatable bar and said shaft, causing thereby the operation of said counter-shaft, a revoluble nut carried by said bar, a balance-gear carried by said counter-shaft, and an operative connection between said gear and said nut, causing thereby a suitable operation of the nut when the gear is operated.

4. In a boring-machine, the combination of a rotatable screw-shaft boring-bar, a revoluble nut mounted thereon, a spur-wheel carried by said nut and adapted when operated to impart movement to the nut, a balance-gear comprising in its construction a loose gear, a spur-wheel carried by the balance-gear and adapted to engage with the spur-wheel of the nut for operating it, means for fixing said loose gear, and an operative connection between the boring-bar and said balance-gear.

Dated this 8th day of May, 1903.

WILLIAM HARKER.
ARTHUR THOMAS ALLCOCK.

Witnesses:
WALTER J. SKERTEN,
GEO. M. FRANKLIN.